US011176333B2

(12) United States Patent
An et al.

(10) Patent No.: US 11,176,333 B2
(45) Date of Patent: Nov. 16, 2021

(54) GENERATION OF SENTENCE REPRESENTATION

(71) Applicant: International Business Machines Corporation, Armonk, NY (US)

(72) Inventors: Bang An, Beijing (CN); HongLei Guo, Beijing (CN); Shiwan Zhao, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 16/405,270

(22) Filed: May 7, 2019

(65) Prior Publication Data

US 2020/0356637 A1 Nov. 12, 2020

(51) Int. Cl.
*G06F 40/56* (2020.01)
*G06F 40/30* (2020.01)
(Continued)

(52) U.S. Cl.
CPC ............ *G06F 40/56* (2020.01); *G06F 40/289* (2020.01); *G06F 40/30* (2020.01); *G06F 40/58* (2020.01)

(58) Field of Classification Search
CPC ......... G10L 15/04; G10L 15/05; G10L 15/08; G10L 15/18; G10L 15/1815; G10L 15/1822; G10L 15/183; G10L 15/187; G10L 15/19; G10L 15/193; G10L 15/197; G10L 2015/088; G06F 40/00; G06F 40/10; G06F 40/20; G06F 40/205; G06F 40/211;

(Continued)

(56) References Cited

U.S. PATENT DOCUMENTS

| 6,701,483 B1 | 3/2004 | Heegard et al. |
| 2008/0037870 A1 | 2/2008 | Knee et al. |

(Continued)

FOREIGN PATENT DOCUMENTS

| CN | 107578106 A | 1/2018 |
| CN | 109062907 A | 12/2018 |

OTHER PUBLICATIONS

Cho et al., ".Learning Phrase Representations Using RNN Encoder-Decoder for Statistical Machine Translation," Submitted on Jun. 3, 2014, 15 pages.

(Continued)

*Primary Examiner* — Andrew C Flanders
(74) *Attorney, Agent, or Firm* — Patterson + Sheridan, LLP

(57) ABSTRACT

Embodiments of the present disclosure relate to generation of sentence representation. In an embodiment, a method is disclosed. According to the method, a sentence graph is generated from a sentence containing words, the sentence graph comprising nodes representing the words and edges connecting the nodes to indicate relationships between the words. Word representations for the plurality of words are determined based on the sentence graph by applying a graph convolution operation on respective sets of neighbor nodes for respective ones of the nodes, a set of neighbor nodes for a node having edges connected with the node. A sentence representation for the sentence is determined based on the word representations for use in a natural language processing task related to the sentence. In other embodiments, a system and a computer program product are disclosed.

14 Claims, 7 Drawing Sheets

(51) Int. Cl.
*G06F 40/289* (2020.01)
*G06F 40/58* (2020.01)

(58) Field of Classification Search
CPC .... G06F 40/232; G06F 40/237; G06F 40/242; G06F 40/247; G06F 40/268; G06F 40/274; G06F 40/279; G06F 40/284; G06F 40/289; G06F 40/30; G06F 40/35; G06F 40/40; G06F 40/55; G06F 40/56; G06F 40/58
See application file for complete search history.

(56) References Cited

U.S. PATENT DOCUMENTS

| | | | |
|---|---|---|---|
| 2009/0132989 | A1 | 5/2009 | Ou et al. |
| 2011/0270604 | A1 | 11/2011 | Qi et al. |
| 2015/0261886 | A1 | 9/2015 | Wu et al. |
| 2017/0235824 | A1* | 8/2017 | Liu ............... G06F 40/00 707/723 |
| 2017/0364503 | A1* | 12/2017 | Anisimovich ....... G06F 40/211 |
| 2018/0013699 | A1* | 1/2018 | Sapoznik ............ G06F 40/205 |
| 2018/0189269 | A1 | 7/2018 | Quirk et al. |
| 2018/0373682 | A1 | 12/2018 | McCann et al. |
| 2018/0373701 | A1 | 12/2018 | McAteer et al. |
| 2019/0050875 | A1* | 2/2019 | McCord ................ G10L 25/63 |
| 2019/0066660 | A1* | 2/2019 | Liang .................... G06F 40/20 |
| 2020/0104366 | A1 | 4/2020 | Xu et al. |
| 2020/0265196 | A1* | 8/2020 | Ravi .................... G06F 40/30 |
| 2020/0327285 | A1* | 10/2020 | Cox ................ G06F 16/90348 |

OTHER PUBLICATIONS

Vaswani et al., "Attention Is All You Need," arXiv:1706.03762v5 [cs.CL] Dec. 6, 2017, 15 pages.
U.S. Appl. No. 16/405,393, "Attention-Based Natural Language Processing," filed May 7, 2019.
IBM, "List of IBM Patents or Patent Applications Treated as Related ," for U.S. Appl. No. 16/405,270, filed May 7, 2019.
Alexis et al., "Supervised Learning of Universal Sentence Representations from Natural Language Inference Data," Jul. 8, 2018, 12 pages.
Chen et al.,"Recurrent Neural Network-Based Sentence Encoder with Gated Attention for Natural Language Inference," arXiv:1708.01353v1 [cs.CL] Aug. 4, 2017, 5 pages.
Tay et al., "Compare, Compress and Propagate: Enhancing Neural Architectures with Alignment Factorization for Natural Language Inference," arXiv:1801.00102v2 [cs.CL] Sep. 10, 2018, 11 pages.
Petar Velikovic, et al., 2018 Graph attention networks. In International Conference on Learning Representations. (Year: 2018).
Tao Ji, et al. Graph-based Dependency Parsing with Graph Neural Networks, Proceedings of the 57th Annual Meeting of the Association for Computational Linguistics, Jul. 28-Aug. 2, 2019. (Year: 2019).
Li, et al. "Information Aggregation for Multi-Head Attention with Routing-by-Agreement," Apr. 2019. (Year: 2019).

* cited by examiner

GENERATION OF SENTENCE REPRESENTATION

BACKGROUND

The present invention relates to natural language processing, and more specifically, to generation of sentence representation.

Many natural language processing tasks involve transforming an input sentence with words in an ordered sequence into a specific output. For example, a machine translation task may map a text sequence in a source natural language to a translated text sequence, which expresses the same semantic meaning in a target natural language. As part of processing the input sentence, a sentence representation is generated to characterize semantic information within the sentence so as to facilitate obtaining the result of the output. Various language analysis/synthesis approaches have been used to analyze a sentence, extract information from the sentence to form a sentence representation for post processing.

SUMMARY

In a first aspect, one embodiment of the present invention provides a computer-implemented method. According to the method, a sentence graph is generated from a sentence containing a plurality of words. The sentence graph comprises nodes representing the plurality of words and edges connecting the nodes. The edges indicate relationships between the words represented by the nodes connected therebetween, and the relationships comprise at least one syntactic relationship. Word representations for the plurality of words are determined based on the sentence graph by applying a graph convolution operation on respective sets of neighbor nodes for respective ones of the nodes, a set of neighbor nodes for a node having edges connected with the node. A sentence representation for the sentence is determined based on the word representations for use in a natural language processing task related to the sentence.

In a second aspect, a further embodiment of the present invention provides a system. The system comprises a processing unit; and a memory coupled to the processing unit and storing instructions thereon. The instructions, when executed by the processing unit, perform acts of the method according to the above first aspect.

In a third aspect, a yet further embodiment of the present invention provides a computer program product. The computer program product comprises a computer readable storage medium having program instructions embodied therewith, the program instructions executable by an electronic device to cause the electronic device to perform acts of the method according to the above first aspect.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
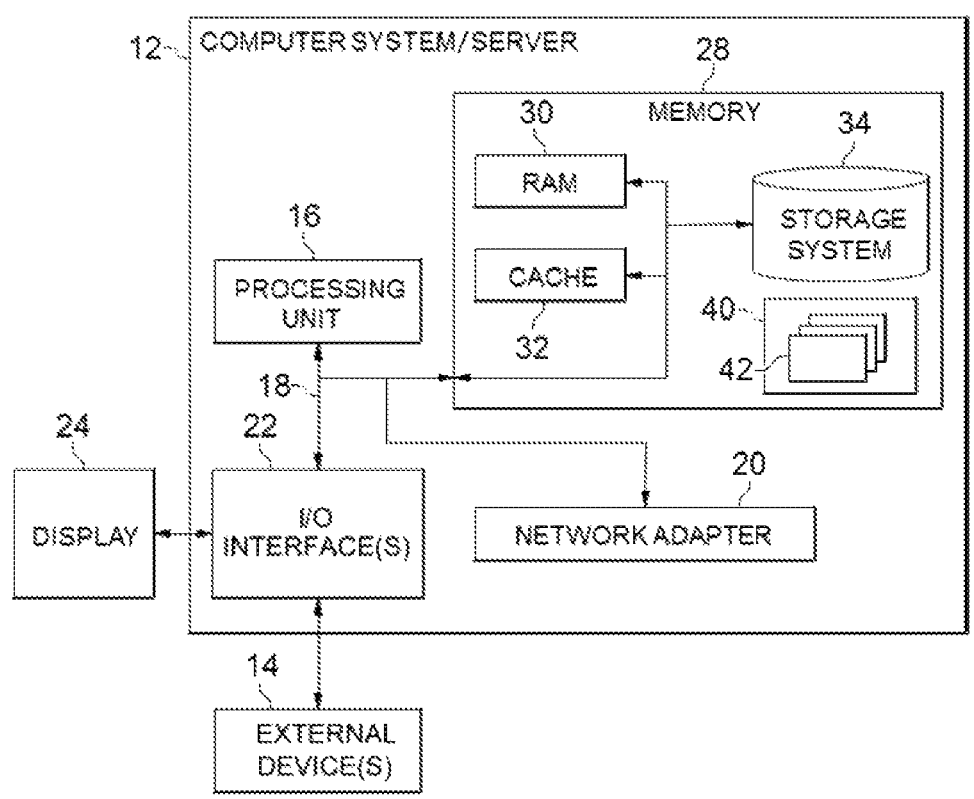
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
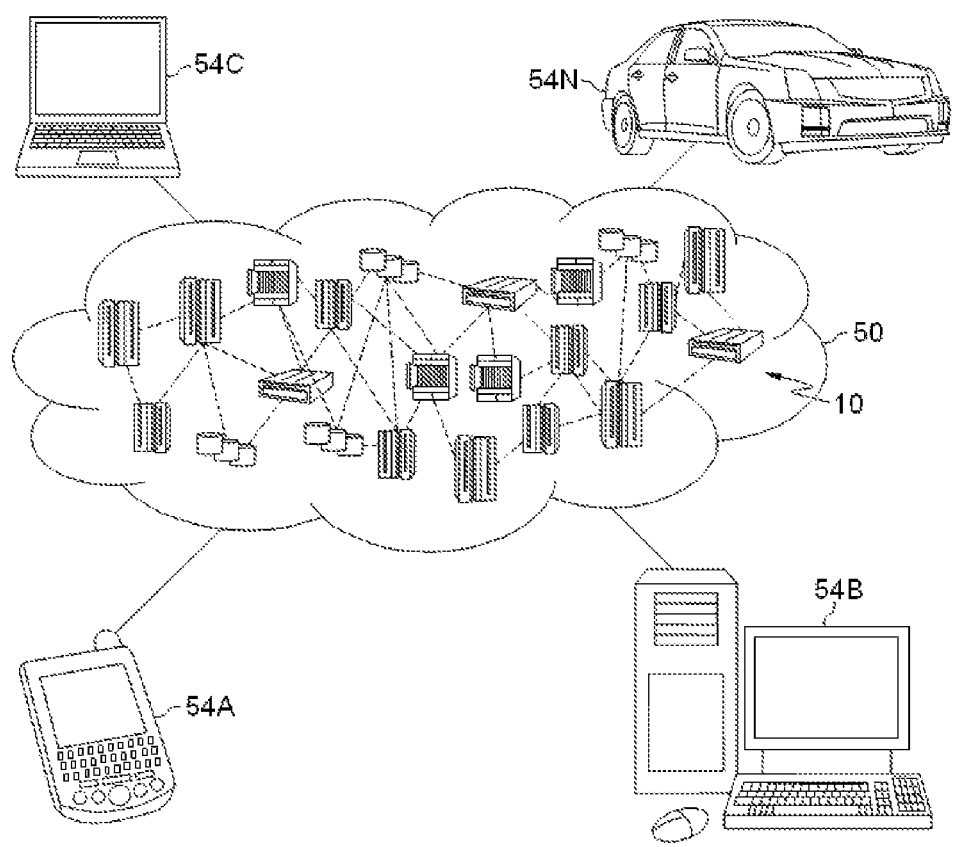
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
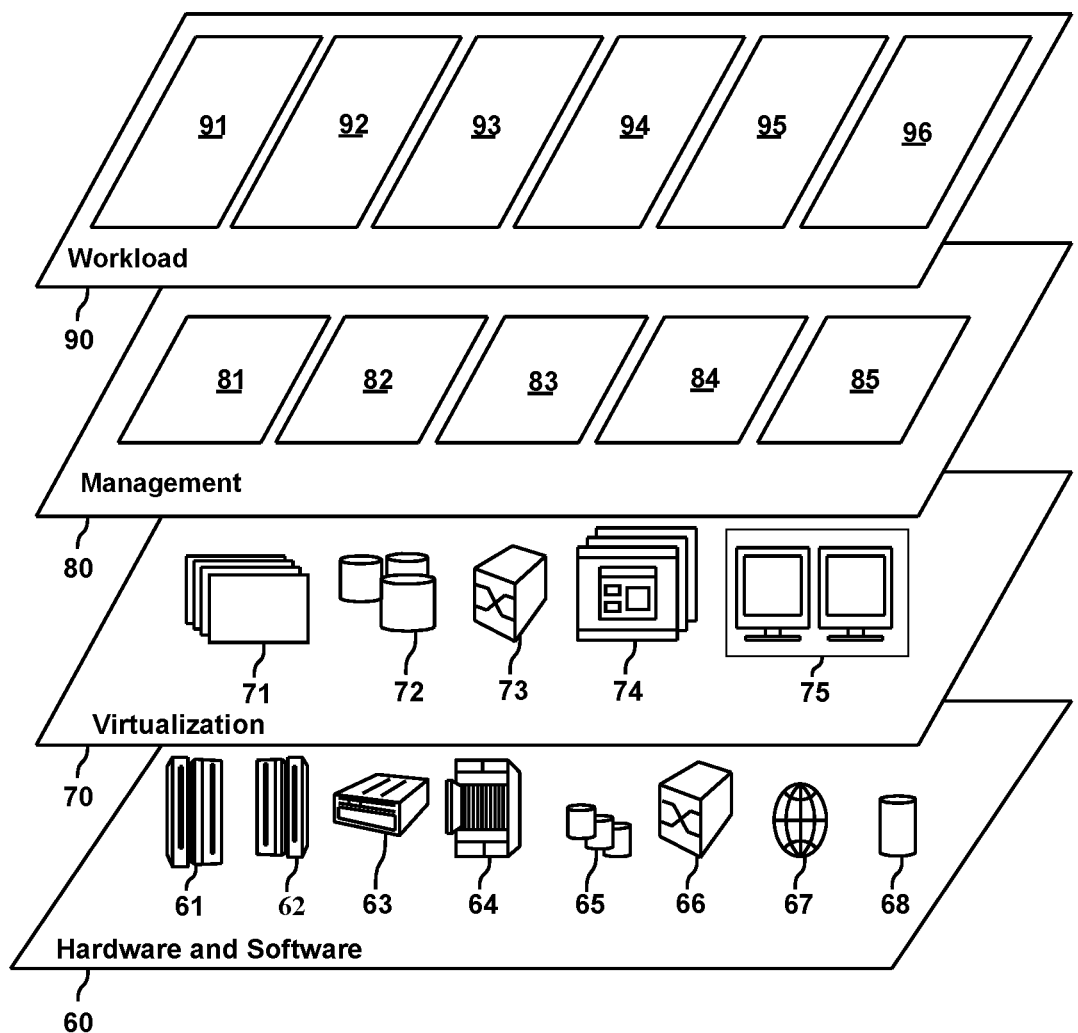
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and nature language processing 96. The functionalities of nature language processing will be described in the following embodiment of the present disclosure.

Figure 4:
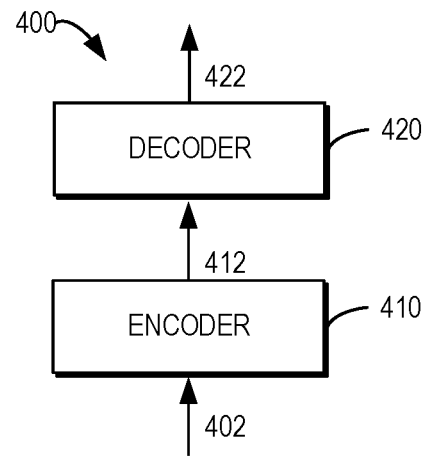
FIG. 4 depicts a block diagram of a system for natural language processing in which embodiments of the present invention can be implemented.

FIG. 4 illustrates a block diagram of a system 400 for natural language processing in which embodiments of the present invention can be implemented. The system 400 has an encoder-decoder structure, including an encoder 410 and a decoder 420. The encoder 410 encodes an input sentence 402 including a plurality of words to a sentence representation 412. The sentence representation 412 is a real-valued representation of the input sentence 402, which characterizes semantic information embedded within the input sentence 402.

Given the sentence representation 412, the decoder 420 then generates an output 422. Depending on the specific natural language processing task to be performed by the system 400, the decoder 420 processes the sentence representation 412 to obtain the corresponding output 422. For example, in a machine translation task, the decoder 420 determines, based on the sentence representation 412, an output sentence which has a same semantic meaning in a target natural language to the input sentence 402 in its source natural language. In a natural language inference (NLI) task, the decoder 420 can determine whether the input sentence 402 semantically entails another input sentence based on sentence representations determined by the encoder 410 for the two input sentences. As a further example, the decoder 420 can label semantic roles or recognize entities of a knowledge base in the input sentence 402 based on the sentence representation 412. Other natural language processing tasks may include text summarization, reading comprehension, relation extraction, and so on. The scope of the embodiments in the present invention is not limited in this regard.

The encoder 410 and decoder 420 may be implemented using neural networks. Neural networks are machine learning models that employ one or more layers of nonlinear units to predict an output for a received input. Some neural networks include one or more hidden layers in addition to an output layer. The output of each hidden layer is used as input to the next layer in the network, which may be the next hidden layer or the output layer. Each layer of the network generates an output from a received input in accordance with current values of a respective set of parameters. The values of the parameters used in the network may be learned during a training process using training data. The encoder 410 and the decoder 420 may be trained in an end-to-end manner to learn the values of their parameters. As such, the encoder 410 can generate a task-dependent sentence representation for use in the decoder 420.

In conventional solutions, a recurrent neural network (RNN) is applied to extract a sentence representation for a sentence as RNN can well model information from a sequence. However, RNN may ignore the syntactic information of the sentence, which results in low accuracy and low performance of following natural language processing tasks.

According to embodiments of the present invention, there is proposed an improved solution for generation of a sentence representation. According to this solution, a sentence is converted into a sentence graph with nodes representing words in the sentence and edges representing respective relationships between the words. Word representations for the words are determined based on the sentence graph by applying a graph convolution operation on respective sets of neighbor nodes for respective ones of the nodes. Here, a set of neighbor nodes for a node have edges connected with the node. A sentence representation is thus determined based on the word representations. In this solution, through convolution across the sentence graph which indicates syntactic relationships between the words, it is possible to encode syntactic information into the sentence representation.

Example embodiments of the present invention will be described in details below with reference to the figures. Some example embodiments of the present invention can be applicable in an encoder of a natural language processing system, such as the encoder 410 of the system 400 in FIG. 4 to generate a sentence representation for a sentence. For purpose of illustration, the following description will be described with reference to FIG. 4.

Figure 5:
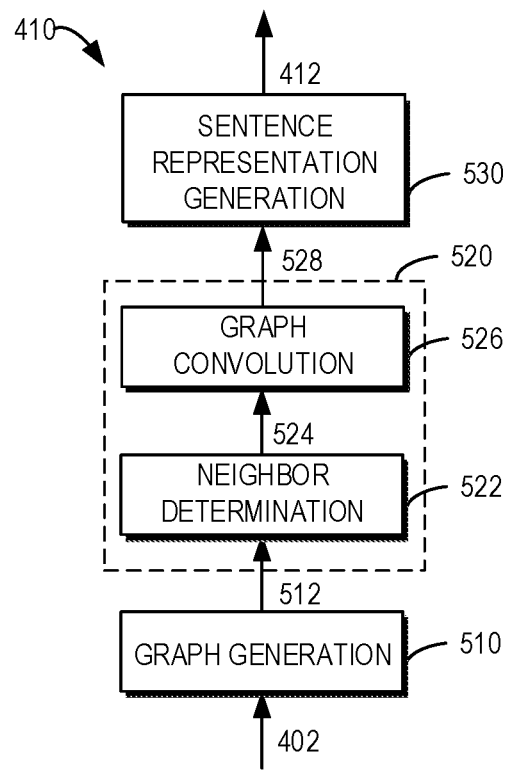
FIG. 5 depicts a block diagram of an encoder of the system of FIG. 4 according to an embodiment of the present invention.

FIG. 5 illustrates a block diagram of the encoder 410 of FIG. 4 according to some embodiments of the present invention. As show, the encoder 410 includes a graph generation module 510 to generate a sentence graph 512 from a sentence 402 based at least in part on syntactic relationships among the words in the sentence 402.

The encoder 410 further includes a word representation generation module 520 to determine word representations 528 for the words in the sentence 402. In some embodiments, the word representation generation module 520 may include a neighbor determination module 522 to identify neighbor nodes 524 that are connected to a given node in the sentence graph and a graph convolution module 526 to perform a graph convolution operation on the neighbor nodes to determine a word representation for a word represented by the given node.

The word representations 528 of all the words in the sentence 402 are provided by the word representation generation module to a sentence representation generation module 530 in the encoder 410. The sentence representation generation module 530 is configured to determine a sentence representation 412 for the sentence 402 based on the word representations 528.

The generation of the sentence graph is first described. The sentence 402 received by the graph generation module 510 contains a sequence of words. The words in the sentence 402 may be from any natural language and organized in a certain order. Any number of words may be included in the sentence 402. According to embodiments of the present invention, the graph generation module 510 generates the sentence graph 512 based at least in part on syntactic relationships among the words in the sentence 402.

The sentence graph 512 includes nodes represents the words in the sentence 402 and edges connecting the nodes. An edge in the sentence graph 512 indicates a relationship between the two words represented by the nodes connected therebetween. The sentence graph 512 includes at least one edge indicating a syntactic relationship between the words represented by the nodes connected therebetween, depending on the syntactic relationships between the words. As will be described below, one or more of the edges in the sentence graph 512 may indicate other relationships.

In some embodiments, the sentence graph 512 may be represented as $\mathcal{G}(\mathcal{V},\varepsilon)$, where $\mathcal{V}$ is a node set and $\varepsilon$ is an edge set. Each node in the node set V represents a word of the sentence 402. In some embodiments, each node is represented by word embedding of the corresponding word. Word embedding is the collective name for a set of language modeling and feature learning techniques in natural language processing (NLP) where words or phrases from a vocabulary are mapped to vectors of real numbers. Word embedding is used by NLP systems as one mechanism for reasoning over natural language sentences. Each edge in the edge set $\varepsilon$ is a tuple $e_{ij}=(v_i,v_j,r_{ij})$ where $r_{ij}$ is a label for a relationship between the words $v_i$ and $v_j$, and i and j each range from 1 to N with N representing the number of nodes in the sentence 402.

In some embodiments of the sentence graph 512, an undirected edge may be used to indicate a relationship between two words represented by the nodes connected by this edge. For example, no matter a relationship is identified from a first word to a second word and/or a further relationship is identified from the second word to the first word, an undirected edge may be added between the nodes representing the first and second words in the sentence graph 512. In some embodiments, the sentence graph 512 may be referred to as an undirected graph if all the edges in the sentence graph 512 have no specific directions.

In some embodiments of the sentence graph 512, a directed edge may be used to specifically indicate a relationship from one word to another word connected therebetween. For example, an edge $e_{ij}=(v_i,v_j,r_{ij})$ may be constructed as having a direction from the j-th node to the i-th node to represent the relationship $r_{ij}$ from the word $v_j$ to the word $v_i$. Such a direction indicates that a syntactic relationship $r_{ij}$ holds between the $v_j$ governor to the dependent $v_i$.

In some embodiments, the sentence graph 512 may be referred to as a directed graph if all the edges in the sentence graph 512 have specific directions. In some embodiments, some of the edges in the sentence graph 512 may have directions while some others may have no directions.

The sentence graph 512 $\mathcal{G}(\mathcal{V},\varepsilon)$ can be represented by two matrices, the node feature matrix $X \in \mathbb{R}^{N \times d}$ and an adjacency matrix $A \in \mathbb{R}^{N \times N}$, where N is the number of nodes and d is the dimension of the word embedding represented by the nodes. X and A can be used as the representation of the sentence graph 512 for further processing in the word representation generation module 520 of the encoder 410. In some embodiments, the sentence graph 512 may further be represented by an edge matrix E representing the edge set ε.

In any natural language, words are organized according to certain syntactic relationships. Without considering such syntactic information in computer processing, a sentence is often treated as a linear chain in which the long-dependency relations among the words are hard to get. The graph generation module 510 of the present invention may apply syntactic parsing on the sentence 402 to determine syntactic relationships among the words in the sentence 402. In some embodiments, the graph generation module 510 may utilize syntactic information such as a dependency parse tree and/or constituency parse tree to determine the dependency relationships and/or constituent relationships between the words. The structure of the sentence graph 512 varies with different syntactic information and different processes of edges used during the syntactic parsing. For example, different parse trees may generate different graphs.

Various technologies for syntactic parsing can be applied by the graph generation module 510. Some types of syntactic relationships may be predefined and the graph generation module 510 may determine whether two of the words in the sentence 402 have any type of the predefined syntactic relationships by means of the syntactic parsing. Some example types of predefined dependency relationships may be listed below for purpose of illustration only.

TABLE 1

Example types of predefined syntactic relationships

| Label | Syntactic Relationship |
|---|---|
| aux | Auxiliary |
| auxpass | passive auxiliary |
| cop | Copula |
| arg | argument |
| comp | Complement |
| acomp | adjectival complement |
| ccomp | clausal complement with internal subject |
| xcomp | clausal complement with external subject |
| obj | object |
| dobj | direct object |
| iobj | indirect object |
| pobj | object of preposition |
| subj | subject |
| nsubj | nominal subject |
| nsubjpass | passive nominal subject |
| csubj | clausal subject |
| csubjpass | clausal subject |
| csubjpass | passive clausal subject |
| mod | Modifier |
| amod | adjectival modifier |
| appos | appositional modifier |
| advcl | adverbial clause modifier |
| det | Determiner modifier |
| ndet | Numeric-determiner modifier |

It would be appreciated that only some examples of dependency relationships are provided above, and more, less, or different dependency relationships may be used to represent the syntactic relationships between the words in the sentence 402.

In some embodiments, when considering the dependency relationships as the syntactic relationships, opposite dependency relationships may also be added into the sentence graph 512. An opposite dependency relationship is a different type of syntactic relationship from the corresponding dependency relationship. The opposite dependency relationships may be indicated by the edges when generating a directed sentence graph 512. For example, if the graph generation module 510 determines that there is a dependency relationship from a first word to a second word in the sentence 402, there might be an opposite relationship dependency relationship from the second word to the first word. As such, a directed edge may be constructed from a first node representing the first word to a second node representing the second word to indicate the dependency relationship, and a further directed edge may be constructed from the second node to the first node to indicate the opposite dependency relationship.

It is supposed that $D_r$ is the set of predefined dependency relationships, and $D'_r$ is the set of opposite dependency relationships for $D_r$. The labels for a dependency relationship and its opposite dependency relationship may be different. For example, if the dependency relationship is labeled as "subj," then the opposite dependency relationship may be labeled as "subj_opposite." Two directed edges in the edge set ε of the sentence graph 512 connecting the i-th node and the j-th node may be represented as $e_{ij}=(v_i, v_j, d_{ij}):d_{ij} \in D_r$ and $e_{ij}=(v_j, v_i, d'_{ij})$, where $d_{ij}$ is the dependency relationship from the word $v_j$ to the word $v_i$, and $d'_{ij}$ is an opposite of the dependency relationship $d_{ij}$ from the word $v_i$ to the word $v_j$.

It would be appreciated that in generation of the sentence graph 512, if it is determined that there is a dependency relationship between two words, the graph generation module 510 may add either one directed edge to indicate the dependency relationship or one directed edge to indicate the opposite dependency relationship. In some other embodiments, the graph generation module 510 may also add both of the directed edges in the sentence graph 512.

Figure 6A:
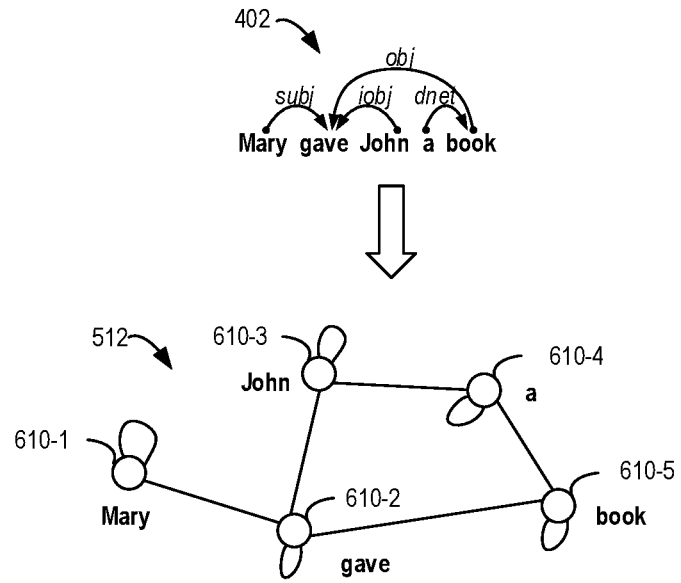
FIGS. 6A and 6B depict schematic diagrams of examples of a sentence graph according to an embodiment of the present invention.
Figure 6B:
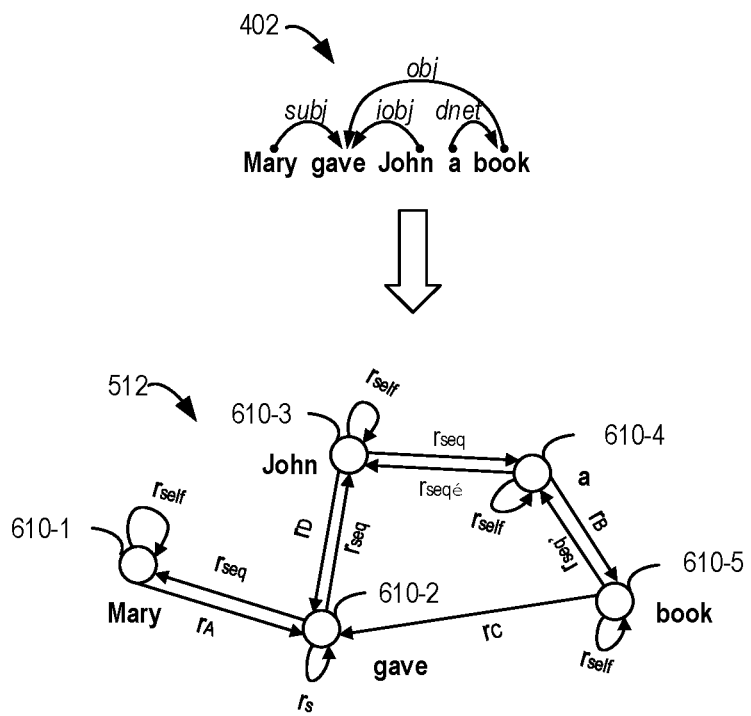

FIGS. 6A and 6B illustrate some examples of the sentence graph 512 generated from the sentence 402. In the examples of FIGS. 6A and 6B, the sentence 402 input to the encoder 410 is "Mary gave John a book." As shown, the syntactic relationship between the word "Mary" and the word "gave" is a subject relationship (represented by a label "sub"), indicating that the word "Mary" is a subject of the word "gave." The syntactic relationship between the word "gave" and the word "John" is an indirect object relationship (represented by a label "iobj"), indicating that the word "John" is an indirect object of the word "gave." The syntactic relationship between the word "a" and the word "book" is a numeric-determiner modifier relationship (represented by a label "dnet"), indicating that the word "a" is a numeric-determiner modifier of the word "book." Further, the syntactic relationship between the word "gave" and the word "book" is an object relationship (represented by a label "obj"), indicating that the word "book" is an object of the word "gave."

Depending on the dependency relationships between the words in the sentence 402, the graph generation module 510 may generate the sentence graph 512. In the sentence graph 512, there are nodes 610-1, 610-2, 610-3, 610-4, and 610-5 representing the words "Mary," "gave," "John," "a," "book," respectively. For ease of discussion, the nodes 610-1, 610-2, 610-3, 610-4, and 610-5 may sometimes be collectively or individually referred to as nodes 610.

In the example of FIG. 6A, an undirected sentence graph 512 is generated with undirected edges connected between the nodes 610 to indicate that there are syntactic relationships among the corresponding words. The directions of the relationships are not specifically indicated due to the undirected edges. As shown, there are at least undirected edges connected between the nodes 610-1 and 610-2 representing "Mary" and "gave" (due to the "subj" relationship), between the nodes 610-2 and 610-5 representing "gave" and "John" (due to the "obj" relationship), between the nodes 610-4 and 610-5 representing "a" and "book" (due to the "dnet" relationship), and between the nodes 610-2 and 610-5 representing "gave" and "book" (due to the "iobj" relationship).

In the example of FIG. 6A, a directed sentence graph 512 is generated where directed edges are connected between the nodes 610 to indicate relationships from words represented by the nodes at the starts of the directed edges to words represented by the nodes at the ends of the directed edges. As shown, there are at least directed edges from the node 610-1 to the node 610-2 due to the "subj" relationship (denoted by "$d_A$") from "Mary" to "gave", from the node 610-2 to the node 610-5 due to the "obj" relationship (denoted by "$d_D$") from "John" to "gave," from the node 610-4 to the node 610-5 due to the "dnet" relationship (denoted by "$d_B$") from "a" to "book," and from the node 610-2 to the node 610-5 due to the "iobj" relationship (denoted by "dc") from "book" to "gave." It is noted that the opposite dependency relationships are not indicated by edges in the example of FIG. 6B.

In addition to the syntactic relationships, the graph generation module 510 may generate the sentence graph 512 to further include edges representing a sequential relationship and/or a self-relationship. In an embodiment, in generating the sentence graph 512, the graph generation module 510 may construct one or more edges to connect one or more of the nodes itself, respectively. In this case, the tuple of the edge in the edge set ε is represented as $e_{ii}=(v_i,v_i,\text{'self'})$, where "self" indicates a label of the self-relationship for the word $v_i$. In some embodiments, the graph generation module 510 may construct respective edges for the nodes in the sentence graph 512 to indicate their self-relationship.

As shown in the example sentence graph 512 in FIGS. 6A and 6B, there are edges connecting individual nodes 610 to the nodes 610 themselves so as to indicate such self-relationship. In the example of FIG. 6B, the directions of the edges indicating the self-relationship are shown. To distinguish from the edges indicating other types of relationships, the type of self-relationship is illustrated by a denotation "$r_{self}$."

In an embodiment, to include edges indicating the sequential relationship, the graph generation module 510 may generate the sentence graph 512 further based on the sequential order of the words in the sentence 402. The sequential relationship between the words is also important since a word and its surrounding words may together constitute a phrase. In some embodiments, the syntactic relationship may prioritize the sequential relationship. More specifically, for any two words in the sentence 402, the graph generation module 510 may first determine whether there is a syntactic relationship between the two words. If the graph generation module 510 determines that there is no syntactic relationship between two words in the sentence 402, this module may further determine whether the two words are adjacent to each other (for example, one word is immediately followed by the other) in the sentence 402. If the two words are adjacent to each other, the graph generation module 510 may construct an edge in the sentence graph 512 to connect two of the nodes representing the two words. This edge may indicate a sequential relationship between the two words.

In some embodiments of generating an undirected sentence graph 512, for any two adjacent words, the graph generation module 510 may connect the corresponding two nodes using an undirected edge to indicate the sequential relationship in response to either identifying a first syntactic relationship from a first one of the two words to a second one of the two words or identifying a second syntactic relationship from the second word to the first word.

Still referring to the example undirected sentence graph 512 shown in FIGS. 6A and 6B, although there is no syntactic relationship from either the word "John" to the word "a" or from the word "a" to "John," there is still an edge connected between the nodes 610-3 and 610-4 in this sentence graph 512. In the example of FIG. 6B, the directions of the edges indicating the sequential relationships are shown. To distinguish from the edges indicating other types of relationships, the type of self-relationship is illustrated by a denotation "$r_{seq}$."

In some embodiments of generating a directed sentence graph 512, for any two adjacent words, the graph generation module 510 may determine whether there are a first syntactic relationship from a first one of the two words to a second one of the two words and a second syntactic relationship from the second word to the first word. In response to only the first syntactic relationship being determined, the graph generation module 510 may construct a directed edge from a first node representing the first word to a second node representing the second word to indicate the first syntactic relationship, and then construct a further directed edge from the second node to the first node to indicate the sequential relationship from the second word to the first word.

In response to only the second syntactic relationship being determined, the graph generation module 510 may construct a directed edge from the second node to the first node to indicate the second syntactic relationship, and then construct a further directed edge from the first node to the second node to indicate the sequential relationship from the first word to the second word. Alternatively, in the case where neither of the two syntactic relationships is determined, the graph generation module 510 may construct two directed edges from the first node to the second node and from the second node to the first node, respectively.

To take the sequential relationships into account, the tuple of the edge in the edge set ε of the sentence graph 512 may be represented as $(v_i, v_{i+1}, \text{'seq'})$ or $(v_i, v_{i-1}, \text{'seq'})$, where "seq" indicates a label of the sequential relationship between the word $v_{i+1}$ or $v_{i-1}$ to the word $v_i$. In an undirected sentence graph 512, an undirected edge may be constructed between the (i+1)-th node and the i-th node to indicate the sequential relationship. In a directed sentence graph 512, two directed edges may be constructed from the (i+1)-th node to the i-th node and from the (i−1)-th node to the i-th node to indicate the sequential relationship between the corresponding words.

The generation of the sentence graph 512 has been discussed in the above example embodiments. It would be appreciated that although different types of relationships among the words (including various syntactic relationships, the sequential relationship, the self-relationship) are described above, the graph generation module 512 may construct the edges in the sentence graph 512 to indicate some or all of these types of relationships. The scope of the embodiments of the present invention is not limited in this regard.

Word representations of the words 528 in the sentence 402 and then the sentence representation 412 are determined based on the sentence graph 512, which will now be discussed in detail.

Referring back to FIG. 5, the word representation generation module 520 in the encoder determines word representations 528 for the words in the sentence 402 based on the sentence graph 512. In some embodiments, the determination of two or more of the word representations 528 may be performed in parallel, which may significantly increase the computational efficiency. The possibility of the parallel determination will be better understood from the following description.

To determine a word representation of a given word in the sentence 402, the neighbor determination module 522 is configured to identify from the sentence graph 512 a set of neighbor nodes 524 having edges connected with a given node representing the given word. The set of the neighbor nodes 524 for the i-th node may be represented as $\mathcal{N}_i$. Here, a "neighbor node" is syntactically related to the given node in a syntactic structure of the sentence 402, but may not be necessarily located adjacent to the given node within the sentence.

In some embodiments, the set of neighbor nodes 524 for the given node includes those that have edges directly connected with the given node, which may also be referred to as the one-hop neighbor nodes (or one-hop neighbors for short). In a specific embodiment of the directed sentence graph 512, the set of neighbor nodes 524 includes nodes that have edges directed to the given node.

For example, in the sentence graph 512 illustrated in the examples of FIGS. 6A and 6B, for the given node 610-1, its set of neighbor nodes includes this node 610-1 itself (because there is an undirected/directed edge indicating the self-relationship) and the node 610-2. For the given node 610-2, its neighbor nodes include the nodes 610-1, 610-2, 610-3, and 610-5 except the node 610-4. The respective sets of neighbor nodes for other nodes in the sentence graph 512 may also be identified accordingly.

The graph convolution module 526 is configured to apply a graph convolution operation on the set of neighbor nodes to obtain the word representation for the given node. By means of the graph convolution operation, information of the neighbor nodes can be passed to the given node to generate the corresponding word representation. The graph convolution module 526 may be designed to utilize of any convolution operations that can be employed to process graph information. In some embodiments, the graph convolution module 526 may be implemented based on a neural network which can implement representation extraction from a graph. Such neural network may also be referred to as a graph neural network (GNN). The graph convolution module 526 may be implemented as one or more layers in the GNN to perform the graph convolution operation.

The first layer of those layers receives the set of neighbor nodes for the given node and processes to generate an output for the given node. The next layer receives the processing results generated by the previous layer for the set of neighbor nodes and processes to generate a further output for the given node. The output of the last layer designed for the graph convolution operation may be the word representation 528 for the given node. By stacking more than one layer (assuming K layers), the word representation 528 may contain information from its K-hop neighbors.

Each of the layers may apply an aggregation function on its input and sometimes such a layer may be referred to as a graph aggregation layer. In some embodiments, the processing for two or more given nodes in the sentence graph 512 may be performed in parallel by the graph aggregation layers. That is, multiple same graph aggregation layers may be configured for the respective nodes to perform their graph convolution operations in parallel.

In some embodiments, the sentence representation generation module 530 is configured to generate the sentence representation 412 based on the word representations 528 determined for all the words in the sentence 402. The sentence representation generation module 530 may be implemented as an output layer in the GNN. Thus, the graph convolution module 526 and the sentence representation generation module 530 may consist of a GNN.

Figure 7:
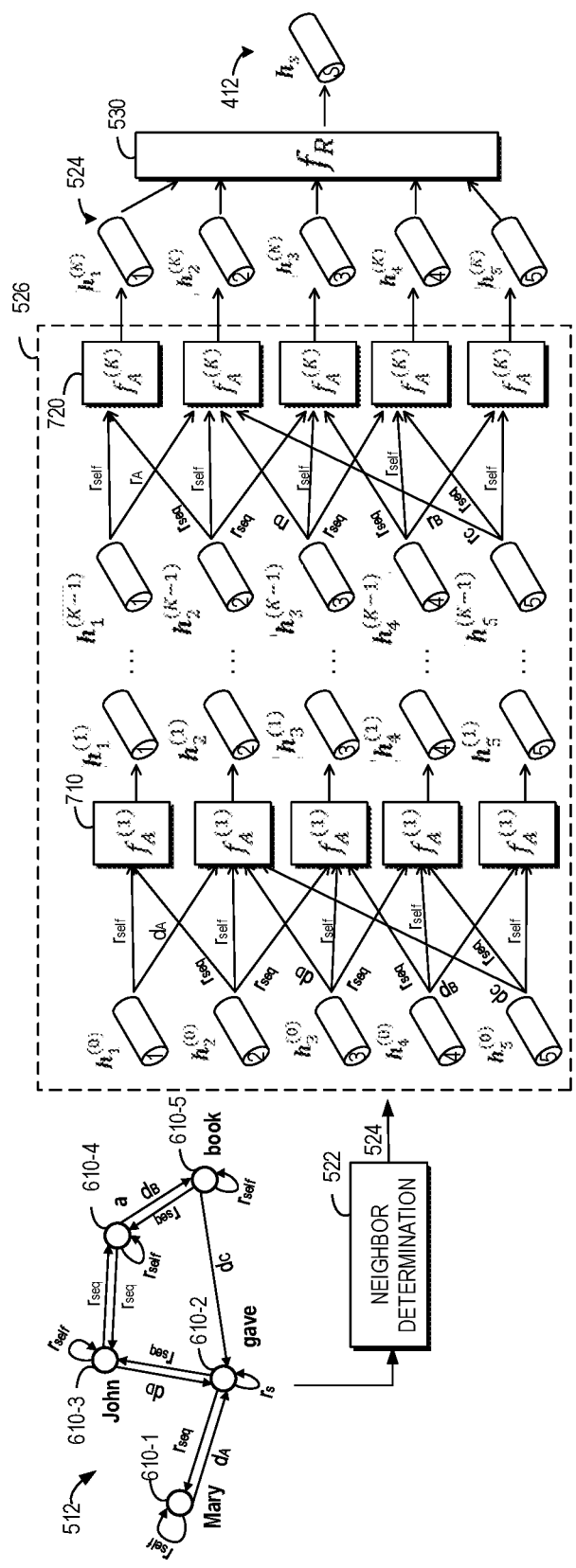
FIG. 7 depicts a block diagram of a word representation generation module and a sentence representation generation module of FIG. 5 according to an embodiment of the present invention.

FIG. 7 illustrates a block diagram of an example of the word representation generation module 520 and the sentence representation generation module 530 of FIG. 5. For purpose of discussion, the directed sentence graph 512 in the example of FIG. 6B is provided as the input to the neighbor determination module 522. As mentioned above, the neighbor determination module 522 may determine the set of neighbor nodes for each of the nodes in the sentence graph 512.

As shown in FIG. 7, the graph convolution module 526 includes graph aggregation layers 710, . . . , 720 to perform the graph convolution operation on each of the nodes 610. It is supposed that K graph aggregation layers are included and K may be greater than or equal to one. In the example of FIG. 7, a plurality of parallel graph aggregation layers 710, . . . , 720 may be configured in the graph convolution module 526 for the graph convolution operation of the respective nodes. The number of the parallel layers may be equal to the number of the node in the sentence graph. Of course, the convolution operations for one or more nodes may not be parallel.

The aggregation at each layer 710, . . . , 720 for a given node may be represented as follows:

$$h_i^{(k)} = f_A^{(k)}(h_i^{(k-1)}, \{h_j^{(k-1)}, r_{ij} : v_j \in \mathcal{N}(v_i)\}) \qquad \text{Equation (1)}$$

where $h_i^{(k)}$ is an output at the k-th layer for the i-th node, which may be in form of a feature vector, and $f_A^{(k)}$ is the aggregation function of the k-th layer. The values of the parameters used in the aggregation may be learned during a training process using training data. The outputs for all the nodes at the k-th layer may be written as:

$$H^{(k)} = f_A^{(k)}(H^{(k-1)}, A) \qquad \text{Equation (2)}$$

where $H^{(k)} \in \mathbb{R}^{N \times d^{(k)}}$ is a feature matrix of all nodes, N is the number of nodes, and $d^{(k)}$ is the dimension of the feature vector output at the k-th layer. In Equation (2), $H^{(0)}=X$, which is the node feature matrix in the representation $\mathcal{G}$ of the sentence graph 512. In Equation (2), A is the adjacency matrix in the representation $\mathcal{G}$ of the sentence graph 512.

In some embodiments, each layer 710, . . . , 720 may be configured to apply a graph convolution operation on the set of neighbor nodes based on weights specific for the set of neighbor nodes, to obtain the word representation for the given node. The weights indicate respective contributions of the set of neighbor nodes to the given node. The weights for the set of neighbor nodes at each layer may be the same or different. In an example, the graph convolution module 526 may combine the set of neighbor nodes (i.e., the word embedding of the corresponding words) by means of weighted summation based on the respective weights and perform a multi-perceptron (MLP) operation or a perceptron operation on the result of the combination.

In some embodiments, considering the neighbor nodes with different relationships may have different contributions when aggregating their information, the weights specific for the set of neighbor nodes may be a first set of weights specific to types of the relationships indicated by the edges between the set of neighbor nodes and the given node. As mentioned above, the relationships indicated by the edges in the sentence graph 512 include different types of syntactic relationships, the sequential relationship, and/or the self-relationship. Weights in the first set may be the same for the same type of relationship, but may be varied for different types of relationships. A graph convolution based on the first set of weights may be referred to as a first graph convolution, or may sometimes be referred to as an edge-based graph convolution because the weights depend on the relationships indicated by the edges.

The first graph convolution based on the first set of weights performed at each layer 710, . . . , 720 may be represented as follows:

$$h_i^{(k)} = MLP^{(k)}\left(\sum_{v_j \in N(v_i)} a_{ij}^{(k)} h_j^{(k-1)}\right) \quad \text{Equation (3)}$$

where $h_i^{(k)}$ is an output at the k-th layer for the i-th node, which may be in form of a feature vector, $a_{ij}^{(k)}$ is a weight in the first set specific for the type of the relationship $r_{ij}$ at the k-th layer. In the directed sentence graph 512, $a_{ij}^{(k)}$ is a weight specific to the relationship from the word $v_j$ represented by the j-th node to the word $v_i$ represented by the i-th node. The weight $a_{ij}^{(k)}$ may be learned during the training process. The outputs for all the nodes at the k-th layer may be written as:

$$H^{(k)} = MLP^{(k)}(A^{(k)} H^{(k-1)}) \quad \text{Equation (4)}$$

Alternatively, or in addition, the weights may include a second set of weights each determined based on the numbers of nodes having edges connected with respective neighbor nodes in the set of neighbor nodes and the number of nodes in the set of neighbor nodes. In a graph convolution based on the second set of weights (referred to as a second graph convolution), the word representation for the given node may further based on the given node in addition to the weighted summation of the set of neighbor nodes.

The second graph convolution based on the second set of weights performed at each layer 710, . . . , 720 may be represented as follows:

$$h_i^{(k)} = MLP^{(k)}\left(\epsilon^{(k)} h_i^{(k-1)} + \sum_{v_j \in N(v_i)} \frac{1}{\sqrt{d_i d_j}} h_j^{(k-1)}\right) \quad \text{Equation (5)}$$

where $h_i^{(k)}$ is an output at the k-th layer for the i-th node, $d_i$ represents the number of nodes in the set of neighbor nodes $\mathcal{N}(v_i)$ for the i-th node (which may also be referred to the degree of the node), $d_j$ represents the number of nodes in the set of neighbor nodes for the j-th node with the j-th node selected from $\mathcal{N}(v_i)$, and $\epsilon^{(k)}$ is a learnable parameter or a fixed scalar for the given i-th node at the k-th layer. The second graph convolution may sometimes be referred to as a degree-based graph convolution.

The outputs for all the nodes at the k-th layer may be written as:

$$H^{(k)} = MLP^{(k)}(\epsilon^{(k)} H^{(k-1)} + D^{-1/2} A_1 D^{-1/2} H^{(k-1)}) \quad \text{Equation (6)}$$

where $A_1$ is the unlabeled adjacency matrix which is similar to the adjacency matrix A; an element $a_{ij}$ in $A_1$ is equal to $r_{ij}$ if there is an edge between the i-th node and the j-th node in the undirected sentence graph 512 or from the i-th node to the j-th node in the directed sentence graph 512, and the element $a_{ij}$ is equal to 0 if there is no such edge. $A_1$ may also be referred to as a relationship-adjacency matrix; D is a matrix comprising the numbers of neighbor nodes for each of the nodes, which may also be regarded as a degree matrix of $A_1$.

In some embodiments, the final result of either the first graph convolution based on the first set of weights or the second graph convolution based on the second set of weights may be determined as the word representation for the given word. In some embodiments, the outputs of the first graph convolution and the second graph convolution (referred to as a first intermediate representation and a second intermediate representation, respectively) may be combined together, for example by means of concatenation, so as to determine the word representation for the given word. The output aggregation may be represented as follows:

$$h_i^{(k)} = MLP^{(k)} \quad \text{Equation (7)}$$
$$\left(\sum_{v_j \in N(v_i)} a_{ij}^{(k)} h_j^{(k-1)} \| \left(\epsilon^{(k)} h_i^{(k-1)} + \sum_{v_j \in N(v_i)} \frac{1}{\sqrt{d_i d_j}} h_j^{(k-1)}\right)\right)$$

where ∥ represents the concatenation. The output of the final layer 720 (represented as the K-th layer) may be determined as the word representation 528 for the given node. The word representations 528 for all the words in the sentence 402 may be determined totally in parallel, partially in parallel, or in a sequential manner.

In some embodiments, the sentence representation generation module 530 may determine the sentence representation 412 based on the word representations 528 by applying a pooling operation. The sentence representation generation module 530 may be considered as a readout layer in the GNN. The pooling operation is a permutation invariant function without parameters. In some examples, the applied pooling operation may include a max-pooling operation which is interpretable and suitable for semantic learning. In some other examples, an average-pooling operation may also be employed. The max-pooling operation and the average-pooling operation are well known and their details are thus omitted here.

The determination of the sentence representation 412 based on the max-pooling may be represented as follows:

$$H_s = \text{MAX}(\{h_i^{(K)} : v_i \in \mathcal{G}\}) \quad \text{Equation (8)}$$

where $h_i^{(K)} \in \mathbb{R}^{N \times d^{(K)}}$ is the word representation 528 for the word $v_i$, N is the number of nodes, and $d^{(K)}$ is the dimension of the feature vector output at the last K-th layer in the graph convolution module 526; MAX (•) represents the max-pooling function; and $h_s \in \mathbb{R}^{d^{(K)}}$ represents the sentence representation 412.

The word representation for each of the words in the sentence 402 may be determined by the word representation generation module 520. All the word representations 528 may be provided for the representation generation module 530. The representation generation module 530 determines, based on the word representations 528, a sentence representation 412 for the sentence 402 for use in a natural language processing task related to the sentence. In some embodiments, the word representations 528 may be organized together to directly form the sentence representation 412. In some other embodiments, the representation generation module 530 may further process the word representations, for example, by applying one or more other neural network layers. The scope of the embodiments of the present invention is not limited in this regard.

The sentence representation 412 may be utilized in various manners in different natural language processing tasks, such as by the decoder 420 of the system 400. The utilization of the sentence representation 412 is also not limited in the embodiments of the present invention. Some examples of the natural language processing tasks may include machine translation, NLI, semantic role labeling, entity reorganization, text summarization, reading comprehension, relation extraction, and so on.

An example structure of the decoder 420 configured to perform an NLI task will be discussed in detail for purpose of illustration only. The purpose of the NIL task is to infer the relationship between a first sentence (referred to as a premise) and a second sentence (referred to as a hypothesis) in their semantics. For example, a NIL task is to determine whether if the first sentence semantically entails the second sentence, whether the first sentence contradict with the second sentence, whether the second sentence is neutral to the first sentence.

Some examples of the NIL tasks are listed in the following Table 2. It would be appreciated that these examples are provided merely for purpose of better understanding without suggesting any limitation to the present invention.

TABLE 2

Examples of NIL tasks

| Premise | Hypothesis | Judgment |
| --- | --- | --- |
| A man inspects the uniform of a figure in some East Asian country. | The man is sleeping. | Contradiction |
| An older and younger man smiling. | Two men are smiling and laughing at the cats playing on the floor. | Neutral |
| A soccer game with multiple males playing. | Some men are playing a sport. | Entailment |

Figure 8:
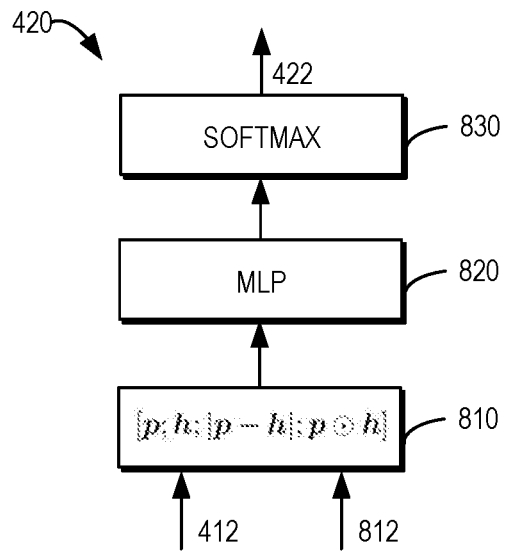
FIG. 8 depicts a block diagram of a decoder of the system of FIG. 4 according to an embodiment of the present invention.

FIG. 8 illustrates a block diagram of an example structure of the decoder 420 configured to perform an NLI task according to some embodiments of the present invention. The decoder 420 is configured to receive the sentence representation 412 of the sentence 402 and a further sentence representation 812 of a further sentence and perform an NLI task based on the sentence representations 412 and 812.

In the example of FIG. 8, the sentence representation 412 is re-denoted as p and the sentence representation 812 is denoted as h. The sentence representation 812 may be determined according to the example embodiments described above for determining the sentence representation 412, or may be determined in a different manner from the sentence representation 412. The scope of the embodiments of the present invention is not limited in this regard.

As shown, the decoder 420 include a matching module 810 configured to matching the sentence representation 412 and the sentence representation 812. In some embodiments, the matching may be implemented as follows:

$$m=[p;h;|p-h|;p\odot h] \quad \text{Equation (9)}$$

A MLP operation module 820 and a softmax operation module 830 are then used to make inference about the relationship between the sentence 402 and the further sentence based on the matching vector m by means of MLP operation and application of a softmax function. The softmax operation module 830 may apply a three-way softmax on the output of the MLP operation module 820.

It would be appreciated that the structure of the decoder 420 illustrated in FIG. 8 is merely an example, other structures of the decoder 420 may be designed to perform the NLI task or other natural language processing tasks. The scope of the embodiments of the present invention is not limited in this regard.

Figure 9:
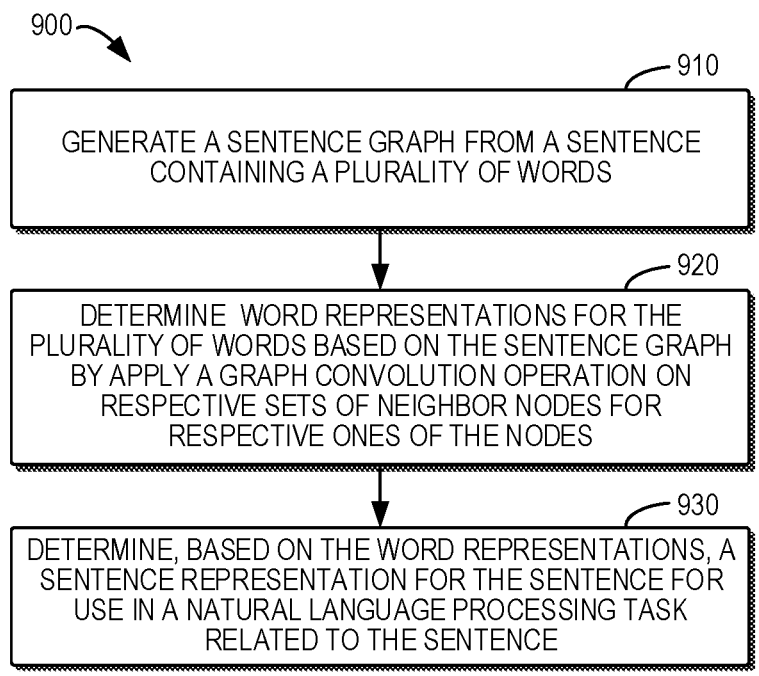
FIG. 9 depicts a flowchart of an example method according to an embodiment of the present invention.

FIG. 9 shows a flowchart of an example method 900 according to an embodiment of the present invention. The method 900 can be implemented at the system 400, for example, by the encoder 410 and/or the decoder 420 as shown in FIG. 4. For the purpose of discussion, the method 900 will be described with reference to FIG. 4.

At block 910, the encoder 410 generates a sentence graph from a sentence containing a plurality of words. The sentence graph comprises nodes representing the plurality of words and edges connecting the nodes, the edges indicating relationships between the words represented by the nodes connected therebetween, and the relationships comprising at least one syntactic relationship. At block 920, the encoder 410 determines word representations for the plurality of words based on the sentence graph by applying a graph convolution operation on respective sets of neighbor nodes for respective ones of the nodes. A set of neighbor nodes for a node have edges connected with the node. At block 930, the encoder 410 determines, based on the word representations, a sentence representation for the sentence for use in a natural language processing task related to the sentence.

In some embodiments, generating the sentence graph further comprises: in response to lacking of a syntactic relationship between a first and a second words of the plurality of words, determining, by one or more processors, whether the first and second words are adjacent to each other in the sentence; and in response to determining that the first and second words are adjacent to each other, constructing, by one or more processors, at least one edge in the sentence graph to connect a first and a second nodes of the nodes representing the first and second words, the at least one edge indicating a sequential relationship between the first and second words.

In some embodiments, constructing the at least one edge comprises: constructing a first directed edge from the first node to the second node in the sentence graph; and constructing a second directed edge from the second node to the first node in the sentence graph, the first and second directed edges both indicating the sequential relationship.

In some embodiments, the at least one syntactic relationship comprises at least one of a dependency relationship from a third word to a fourth word of the plurality of words and an opposite dependency relationship from the fourth word to the third word, the opposite dependency relationship being opposite from the dependency relationship. In some embodiments, generating the sentence graph comprises constructing at least one of the following edges: constructing a third directed edge from a third node representing the third word to a fourth node representing the fourth word to indicate the dependency relationship; and constructing a fourth directed edge from the fourth node to the third node to indicate the opposite dependency relationship.

In some embodiments, generating the sentence graph further comprises: constructing, by one or more processors, a further edge in the sentence graph to connect one of the nodes itself, the further edge indicating a self-relationship.

In some embodiments, applying the graph convolution operation comprises: applying a graph convolution operation on the set of neighbor nodes based on weights specific for the set of neighbor nodes, the weights indicating contributions of the set of neighbor nodes to the word representation.

In some embodiments, applying the graph convolution operation based on the weights comprises: applying, by one or more processors, the graph convolution operation based on at least one of the following: a first set of weights specific to types of the relationships indicated by the edges between the set of neighbor nodes and the given node, and a second set of weights each determined based on the numbers of nodes having edges connected with respective neighbor nodes in the set of neighbor nodes and the number of nodes in the set of neighbor nodes.

In some embodiments, applying the graph convolution operation comprises: applying, by one or more processors, a first graph convolution on the set of neighbor nodes based on the first weights to obtain a first intermediate representation; applying, by one or more processors, a second graph convolution on the set of neighbor nodes based on the second weights to obtain a second intermediate representation; and combining, by one or more processors, the first and second intermediate representations to obtain the word representation.

In some embodiments, the edges comprise a first directed edge from the given node to a further node in the set of neighbor nodes and a second directed edge from the further node to the given node, the first directed edge indicating a first relationship from a given word represented by the given node to a further word represented by the further node, the second directed edge indicating a second relationship from the further word to the given word. In some embodiments, the first set of weights comprises a weight specific to a type of the second relationship instead of to a type of the first relationship.

In some embodiments, determining the word representations comprises: determining, by one or more processors, a word representation for a word of the plurality of words in parallel with determining of at least one further word representation for at least one further word of the plurality of words.

In some embodiments, a set of neighbor nodes for a node have directed edges with the node to indicate relationships from words of the plurality of words represented by the neighbor nodes to a word represented by the node.

In some embodiments, the decoder 420 obtains a further sentence representation of a further sentence and performs a natural language interference task based on the sentence representation for the sentence from the encoder 410 and the further sentence representation. The further sentence representation may be determined by the encoder 410 according to the embodiments of the present invention.

It should be noted that the natural language processing according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    applying, by one or more processors, a machine learning model to a sentence containing a plurality of words to generate a sentence graph comprising nodes representing the plurality of words and edges connecting the nodes, the edges indicating relationships between the words represented by the nodes connected therebetween, and the relationships comprising at least one syntactic relationship, wherein:
        the at least one syntactic relationship comprises at least one of a dependency relationship from a first word of the plurality of words to a second word of the plurality of words or an opposite dependency relationship from the second word to the first word, the opposite dependency relationship being opposite from the dependency relationship; and
        generating the sentence graph comprises constructing at least one of (i) a first directed edge from a first node representing the first word to a second node representing the second word to indicate the dependency relationship or (ii) a second directed edge from the second node to the first node to indicate the opposite dependency relationship;
    applying, by one or more processors, the machine learning model to determine word representations for the plurality of words based on the sentence graph by applying a graph convolution operation on respective sets of neighbor nodes for respective ones of the nodes based on weights specific for the respective sets of neighbor nodes, wherein a set of neighbor nodes for a node has edges connected with the node, wherein the weights indicate contributions of the respective sets of neighbor nodes to the word representations, and wherein the weights comprise at least one of a first set of weights specific to types of relationships indicated by edges between the respective sets of neighbor nodes and the respective ones of the nodes or a second set of weights determined based on a number of nodes having edges connected with respective neighbor nodes in the respective sets of neighbor nodes and a number of nodes in the respective sets of neighbor nodes; and
    determining, by one or more processors and based on the word representations, a sentence representation for the sentence for use in a natural language processing task related to the sentence.

2. The method of claim 1, wherein generating the sentence graph further comprises:
    in response to lacking of a syntactic relationship between a third word and a fourth word of the plurality of words, determining, by one or more processors, whether the third and fourth words are adjacent to each other in the sentence; and
    in response to determining that the third and fourth words are adjacent to each other, constructing, by one or more processors, at least one edge in the sentence graph to connect a third node representing the third word and a fourth node representing the fourth word, the at least one edge indicating a sequential relationship between the third and fourth words.

3. The method of claim 2, wherein constructing the at least one edge comprises:
    constructing a third directed edge from the third node to the fourth node in the sentence graph; and
    constructing a fourth directed edge from the fourth node to the third node in the sentence graph, the third and fourth directed edges both indicating the sequential relationship.

4. The method of claim 1, wherein generating the sentence graph further comprises:
    constructing, by one or more processors, a further edge in the sentence graph to connect one of the nodes with itself, the further edge indicating a self-relationship.

5. The method of claim 1, wherein applying the graph convolution operation comprises:
applying, by one or more processors, a first graph convolution on the set of neighbor nodes based on the first set of weights to obtain a first intermediate representation;
applying, by one or more processors, a second graph convolution on the set of neighbor nodes based on the second set of weights to obtain a second intermediate representation; and
combining, by one or more processors, the first and second intermediate representations to obtain a word representation.

6. The method of claim 1, wherein:
the edges comprise a third directed edge from a given node of the sentence graph to a further node in the set of neighbor nodes and a fourth directed edge from the further node to the given node, the third directed edge indicating a first relationship from a given word represented by the given node to a further word represented by the further node, the fourth directed edge indicating a second relationship from the further word to the given word; and
the first set of weights comprises a weight specific to a type of the second relationship instead of to a type of the first relationship.

7. The method of claim 1, wherein determining the word representations comprises determining, by one or more processors, a word representation for a word of the plurality of words in parallel with determining at least one further word representation for at least one further word of the plurality of words.

8. The method of claim 1, wherein the set of neighbor nodes for the node have directed edges with the node to indicate relationships from words of the plurality of words represented by the set of neighbor nodes to a word represented by the node.

9. A system comprising:
a processing unit; and
a memory coupled to the processing unit and storing instructions thereon, the instructions, when executed by the processing unit, performing acts comprising:
applying a machine learning model to a sentence containing a plurality of words to generate a sentence graph comprising nodes representing the plurality of words and edges connecting the nodes, the edges indicating relationships between the words represented by the nodes connected therebetween, and the relationships comprising at least one syntactic relationship, wherein:
the at least one syntactic relationship comprises at least one of a dependency relationship from a first word of the plurality of words to a second word of the plurality of words or an opposite dependency relationship from the second word to the first word, the opposite dependency relationship being opposite from the dependency relationship; and
generating the sentence graph comprises constructing at least one of (i) a first directed edge from a first node representing the first word to a second node representing the second word to indicate the dependency relationship or (ii) a second directed edge from the second node to the first node to indicate the opposite dependency relationship;
applying the machine learning model to determine word representations for the plurality of words based on the sentence graph by applying a graph convolution operation on respective sets of neighbor nodes for respective ones of the nodes based on weights specific for the respective sets of neighbor nodes, wherein a set of neighbor nodes for a node having edges connected with the node, wherein the weights indicate contributions of the respective sets of neighbor nodes to the word representations, and wherein the weights comprise at least one of a first set of weights specific to types of relationships indicated by edges between the respective sets of neighbor nodes and the respective ones of the nodes or a second set of weights determined based on a number of nodes having edges connected with respective neighbor nodes in the respective sets of neighbor nodes and a number of nodes in the respective sets of neighbor nodes; and
determining, based on the word representations, a sentence representation for the sentence for use in a natural language processing task related to the sentence.

10. The system of claim 9, wherein generating the sentence graph further comprises:
in response to lacking of a syntactic relationship between a third word and a fourth word of the plurality of words, determining whether the third and fourth words are adjacent to each other in the sentence; and
in response to determining that the third and fourth words are adjacent to each other, constructing at least one edge in the sentence graph to connect a third node and a fourth node representing the third and fourth words, the at least one edge indicating a sequential relationship between the third and fourth words.

11. The system of claim 10, wherein constructing the at least one edge comprises:
constructing a third directed edge from the third node to the fourth node in the sentence graph; and
constructing a fourth directed edge from the fourth node to the third node in the sentence graph, the third and fourth directed edges both indicating the sequential relationship.

12. The system of claim 9, wherein generating the sentence graph further comprises constructing a further edge in the sentence graph to connect one of the nodes with itself, the further edge indicating a self-relationship.

13. The system of claim 9, wherein applying the graph convolution operation comprises:
applying a first graph convolution on the set of neighbor nodes based on the first set of weights to obtain a first intermediate representation;
applying a second graph convolution on the set of neighbor nodes based on the second set of weights to obtain a second intermediate representation; and
combining the first and second intermediate representations to obtain a word representation.

14. A computer program product, the computer program product comprising a non-transitory computer readable storage medium having program instructions embodied therewith, the program instructions executable by an electronic device to cause the electronic device to perform acts comprising:
applying a machine learning model to a sentence containing a plurality of words to generate a sentence graph comprising nodes representing the plurality of words and edges connecting the nodes, the edges indicating relationships between the words represented by the nodes connected therebetween, and the relationships comprising at least one syntactic relationship, wherein:

the at least one syntactic relationship comprises at least one of a dependency relationship from a first word of the plurality of words to a second word of the plurality of words or an opposite dependency relationship from the second word to the first word, the opposite dependency relationship being opposite from the dependency relationship; and generating the sentence graph comprises constructing at least one of (i) a first directed edge from a first node representing the first word to a second node representing the second word to indicate the dependency relationship or (ii) a second directed edge from the second node to the first node to indicate the opposite dependency relationship;

applying the machine learning model to determine word representations for the plurality of words based on the sentence graph by applying a graph convolution operation on respective sets of neighbor nodes for respective ones of the nodes based on weights specific for the respective sets of neighbor nodes, wherein a set of neighbor nodes for a node having edges connected with the node, wherein the weights indicate contributions of the respective sets of neighbor nodes to the word representations, and wherein the weights comprise at least one of a first set of weights specific to types of relationships indicated by edges between the respective sets of neighbor nodes and the respective ones of the nodes or a second set of weights determined based on a number of nodes having edges connected with respective neighbor nodes in the respective sets of neighbor nodes and a number of nodes in the respective sets of neighbor nodes; and determining, based on the word representations, a sentence representation for the sentence for use in a natural language processing task related to the sentence.

* * * * *